United States Patent
Haneda et al.

(10) Patent No.: US 7,213,867 B2
(45) Date of Patent: May 8, 2007

(54) SHOCK ABSORBING DEVICE FOR VEHICLE AND SHOCK ABSORBING STRUCTURE FOR VEHICLE

(75) Inventors: Shinichi Haneda, Anjo (JP); Kiyoichi Kita, Takaoka (JP); Masashi Neo, Toyota (JP)

(73) Assignees: Aisin Seiki Kabushiki Kaisha, Kariya-shi, Aichi-ken (JP); Aisin Keikinzoku Kabushiki Kaisha, Shinminato-shi, Toyama-ken (JP)

( * ) Notice: Subject to any disclaimer, the term of this patent is extended or adjusted under 35 U.S.C. 154(b) by 0 days.

(21) Appl. No.: 11/234,284

(22) Filed: Sep. 26, 2005

(65) Prior Publication Data
US 2006/0066115 A1 Mar. 30, 2006

(30) Foreign Application Priority Data

Sep. 28, 2004 (JP) .............................. 2004-282503
Aug. 2, 2005 (JP) .............................. 2005-224279

(51) Int. Cl.
*B60R 19/26* (2006.01)

(52) U.S. Cl. ..................... 296/132; 188/377; 267/294; 267/116; 267/139

(58) Field of Classification Search ................ 293/132, 293/133, 136; 188/377; 267/80, 219, 35, 267/294, 116, 139, 140, 140.3, 140.4, 141, 267/141.1, 141.6, 145, 152, 181
See application file for complete search history.

(56) References Cited

U.S. PATENT DOCUMENTS

| 4,077,495 | A | * | 3/1978 | Chase ..................... 188/376 |
| 5,746,419 | A | * | 5/1998 | McFadden et al. ......... 267/140 |
| 5,868,457 | A | * | 2/1999 | Kitagawa ............... 296/187.09 |
| 6,085,878 | A | * | 7/2000 | Araki et al. ................. 188/377 |
| 6,472,043 | B1 | * | 10/2002 | Kobayashi et al. ......... 428/116 |
| 6,959,894 | B2 | * | 11/2005 | Hayashi ..................... 244/17.11 |
| 2002/0043809 | A1 | * | 4/2002 | Vismara ..................... 293/133 |
| 2002/0060463 | A1 |   | 5/2002 | Gotanda et al. |
| 2002/0074830 | A1 | * | 6/2002 | Takemoto .............. 296/203.02 |

FOREIGN PATENT DOCUMENTS

| EP | 1 045 165 | 10/2000 |
| EP | 1 234 729 | 8/2002 |
| EP | 1 650 466 | 4/2006 |
| FR | 2 734 328 | 11/1996 |
| JP | 2002-104107 | 4/2002 |
| JP | 2004-106612 | 4/2004 |

* cited by examiner

*Primary Examiner*—Lori L. Coletta
(74) *Attorney, Agent, or Firm*—Finnegan, Henderson, Farabow, Garrett & Dunner, LLP (57) ABSTRACT

A shock absorbing device for a vehicle, absorbing an axial compression load by means of plastic deformation in order to absorb an impact energy, is hollowed and has an octagonal cross section.

4 Claims, 5 Drawing Sheets

Known work

FIG. 10B

Known work

SHOCK ABSORBING DEVICE FOR VEHICLE AND SHOCK ABSORBING STRUCTURE FOR VEHICLE

CROSS REFERENCE TO RELATED APPLICATIONS

This application is based on and claims priority under 35 U.S.C. § 119 to Japanese Patent Application 2004-282503, filed on Sep. 28, 2004, and Japanese Patent Application 2005-224279, filed on Aug. 2, 2005 the entire content of which is incorporated herein by reference.

FIELD OF THE INVENTION

The present invention relates to a shock absorbing device for a vehicle and a shock absorbing structure for a vehicle.

BACKGROUND

A known shock absorbing structure for a vehicle disclosed in for example JP2002-155980A (US2002060463A1) includes a bumper reinforcement and a pair of side members extending in a longitudinal direction of the vehicle, each of which is located at end of a bumper reinforcement. Further, a crash absorbing box serving as a shock absorbing device is provided between the bumper reinforcement and each of the side members. This crash absorbing box is consecutively plastic deformed (buckling deformed) so as to be in a concertina shape in order to absorb the impact energy.

For example, one known crash absorbing box is comprised of a pair of pressed iron material in the shape of square bracket with corners cut off in cross section, and these materials are put together and welded so as to be hollowed and have a rectangular cross section.

Another known crash absorbing box is comprised of a flat iron plate and a pressed iron material in the shape of square bracket with corners cut off in cross section, and these materials are put together and welded so as to be hollowed and have a hexagonal cross section.

Because the crash absorbing box hollowed and has a rectangular cross section or a hexagonal cross section has small number of the ridge lines extending in an axial direction, in other words, the number of peak points in its cross section of the crash absorbing box is small, the thickness of the crash absorbing box needs to be increased in order to increase a level of the load (axial compression load) required for deforming the crash absorbing box.

Further, because the length of each side of the crash absorbing box in cross section is long, a wave length of the load (axial compression load) required when the crash absorbing box is consecutively plastic deformed (buckling deformed) so as to be in a concertina shape in order to absorb the impact energy, becomes large, and then amplitude of the load (axial compression load) becomes large, as a result, the energy absorbing effect is reduced. The energy absorbing effect can be calculated by the formula; (energy absorbing amount)/(maximum load×maximum stroke). In this formula, the maximum stroke means a stroke at a point where, even when the load is applied, the crash absorbing box is no longer deformed. In addition, the energy absorbing amount means a total of the load absorbed by the crash absorbing box until the stroke becomes a maximum value, in other words, the energy absorbing amount means an area which is closed by each of lines and the x-axis in FIG. 6.

Structures of the crash absorbing box being hollowed and having a rectangular cross section and a hexagonal cross section and an energy absorbing manner of the crash absorbing box upon an axial compression obtained on a basis of an experimental test will be explained.

Figure 10:
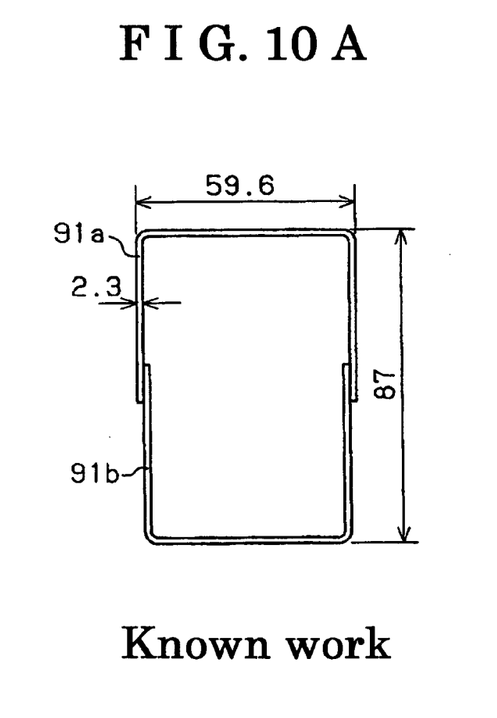
FIG. 10A illustrates a front view indicating a known work related to this invention.
FIG. 10B illustrates a front view indicating another known work related to this invention.

FIG. 10A illustrates a front view indicating the crash absorbing box 91 being hollowed and having a rectangular cross section.

As shown in FIG. 10A, the crash absorbing box 91 includes a pair of pressed iron materials 91a and 91b. Specifically, these materials formed has an approximate C-shaped cross section with each corner makes a right angle, and these materials are put together and welded so as to be in a rectangular shape in its cross section. A length of the long sides of the crash absorbing box 91 is set to 87 mm, and a length of the short sides of the crash absorbing box is set to 59.6 mm. Further, a thickness of the crash absorbing box 91 is set to 2.3 mm, and a length of the crash absorbing box 91 in an axial direction (in a direction perpendicular to FIG. 10A) is set to 114.2 mm.

Furthermore, on the top end portion of the crash absorbing box 91 in an axial direction, a stress concentrated portion (vulnerable portion) is formed to be a starting point for the plastic deformation caused by an axial compression load. The stress concentrated portions are formed in order to reduce the axial compression load by which the crash absorbing box 91 starts plastic deformation (initial buckling deformation).

Figure 6:
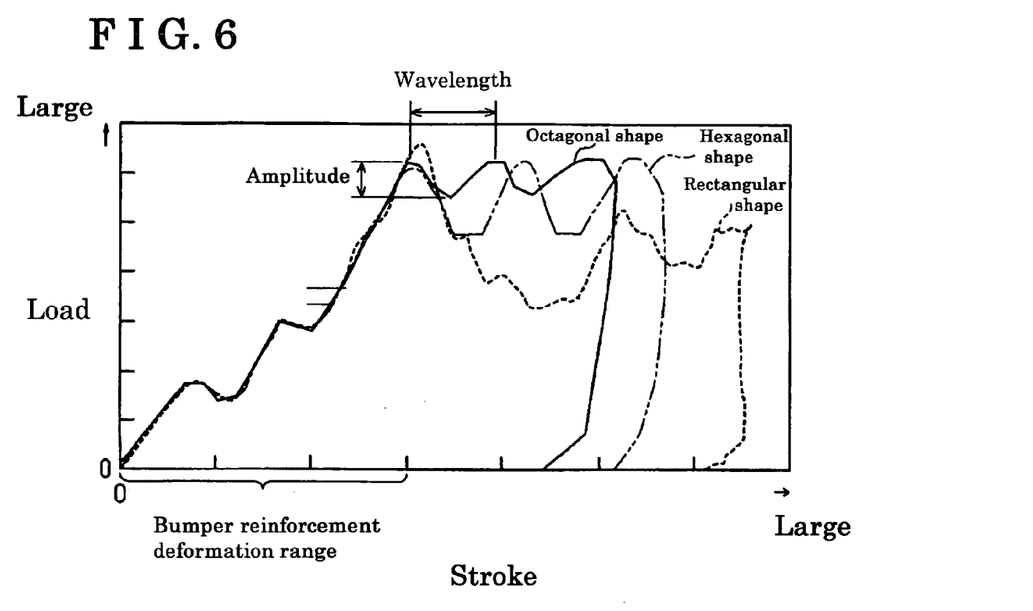
FIG. 6 illustrates a graph showing a relationship between a deformation characteristic (stroke) of a crash absorbing box and an axial compression load.

A dashed line in FIG. 6 indicates a relationship between a deformation characteristic (stroke) and an axial compression load based on an experimental test in which a predetermined energy amount J (joule) is applied to the crash absorbing box 91 and the bumper reinforcement 16 so as to be compressed in an axial direction. A range in which the bumper reinforcement has been deformed is also shown in FIG. 6.

As shown in FIG. 6, the crash absorbing box 91 being hollowed and having a rectangular cross section performs large wavelength and large amplitude of the load (axial compression load) required for deforming the crash absorbing box when the crash absorbing box 91 has consecutively repeated plastic deformation (buckling deformation) so as to be in a concertina shape in order to absorb the impact energy.

Further, it is experimentally confirmed that the energy absorbing effect, which is obtained until the stroke reaches the maximum stroke, is low such as 65%.

FIG. 10B illustrates a front view indicating the crash absorbing box 92 being hollowed and having a hexagonal cross section.

As shown in FIG. 10B, the crash absorbing box 92 includes a flat iron plate 92a and a pressed iron material 92b formed so as to be in a square bracket with corners cut off in cross section. Specifically, these materials are put together and welded so as to be in a rectangular shape in its cross section, and each of the welding portions makes a right angle. Further, a long side of the pressed iron material 92b is located so as to be perpendicular to each of the short sides of the pressed iron material 92b.

Assuming that each corner of the pressed iron materials 92b exist, a length of the long side is set to 115.7 mm, and a length of each of the short sides is set to 62.5 mm. Further, a thickness of the iron plate 92a is set to 2 mm, and a thickness of the pressed iron material 92b is set to 1.6 mm, and a length of the crash absorbing box 92 in an axial direction (in a direction perpendicular to FIG. 10B) is set to 232 mm.

Furthermore, on the top end portion of the crash absorbing box 92 in an axial direction, a stress concentrated portion (vulnerable portion) is formed to be a starting point of the plastic deformation caused by an axial compression load.

A chain double-dashed line in FIG. 6 indicates a relationship between a deformation characteristic (stroke) and an axial compression load based on an experimental test in which a predetermined energy amount J is applied to the crash absorbing box 92 and the bumper reinforcement 16 so as to be compressed in an axial direction.

As shown in FIG. 6, the crash absorbing box 92 being hollowed and having a hexagonal cross section performs small wavelength and small amplitude of the load (axial compression load) required for deforming the crash absorbing box. However, it is experimentally confirmed that the energy absorbing effect, which is obtained until the stroke reaches the maximum stroke, is low such as 80%.

A need thus exist to provide a shock absorbing device for a vehicle and a shock absorbing structure for a vehicle which can be reduced in size and can improve an energy absorbing effect.

SUMMARY OF THE INVENTION

According to an aspect of the present invention, a shock absorbing device for a vehicle, absorbing an axial compression load by means of plastic deformation in order to absorb an impact energy, is hollowed and has an octagonal cross section.

According to another aspect of the present invention, a shock absorbing structure for a vehicle comprises a bumper reinforcement extending in a vehicle width direction, a pair of side members provided at the bumper reinforcement in a manner where each of the side members is provided at an end thereof and extends in a longitudinal direction of the vehicle and a crash absorbing box provided between the bumper reinforcement and each of the side members, wherein the crash absorbing box is hollowed and has an octagonal cross section.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION (First Embodiment)

Figure 3:
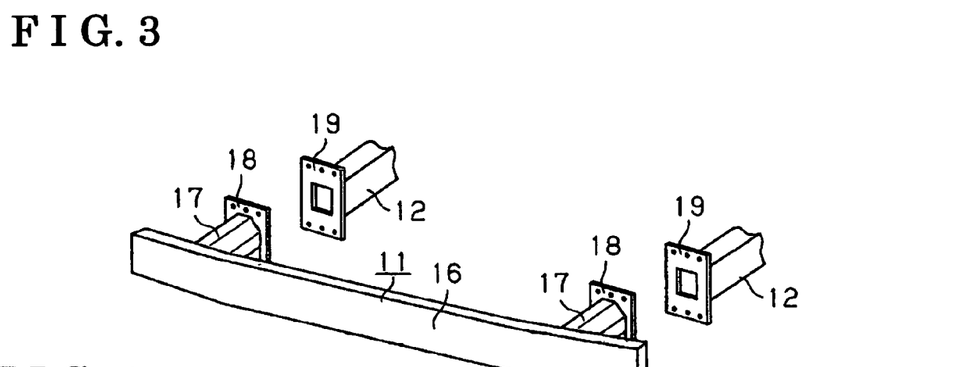
FIG. 3 illustrates an oblique perspective view indicating a front portion of a vehicle.

A first embodiment according to the present invention will be explained with reference to attached drawing figures. FIG. 3 illustrates an oblique perspective view schematically indicating a front portion of a vehicle such as an automobile to which the present invention is applied. As shown in FIG. 3, a bumper frame 11 and a pair of side members 12 are provided at the front portion. Specifically, the bumper frame 11 serves as a bone structure of a bumper, and the pair of the side members 12 extends in a longitudinal direction of the vehicle so as to configure a part of the vehicle body are provided.

The bumper frame 11 includes a bumper reinforcement 16, which extends in a vehicle width direction, and a pair of crash absorbing boxes 17. Specifically, the pair of crash absorbing boxes 17 is provided at each of end portions of the bumper reinforcement 16 in a width direction thereof so as to be positioned between the bumper reinforcement 17 and the pair of side members 12. Each of the crash absorbing boxes 17 is fixed to the bumper reinforcement 16 by screwing or welding. Further, the crash absorbing box 17 is hollowed and has an octagonal cross section whose axis line extends in a longitudinal direction of the vehicle. To a rear end portion of each of the crash absorbing boxes 17, a bracket 18 to which a bolt is screwed is fixed by welding.

The side member 12 is formed so as to be hollowed and have a rectangular cross section, and extends in a manner where its axis line extends approximately corresponding to an axis line of the crash absorbing box 17.

A bracket 19, formed to be corresponding to the bracket 18 and to which a bolt is screwed, is attached to the front end of each of the side member 12. Thus, the bumper frame 11 is fixed to the body in a manner where the bracket 18 of the crash absorbing box 17 is attached to the bracket 19 of the side member 12 by screwing.

When a shock caused by a collision is applied to the vehicle from the front of the vehicle, the shock is transmitted to the body (side member 12) by means of the crash absorbing box 17 of the bumper frame 11. At this point, each crash absorbing box 17 repeats buckling deformation in its axis direction in order to absorb the shock that is transmitted to the body. Thus, an impact energy applied to the body and a passenger can be is absorbed.

Figure 2:
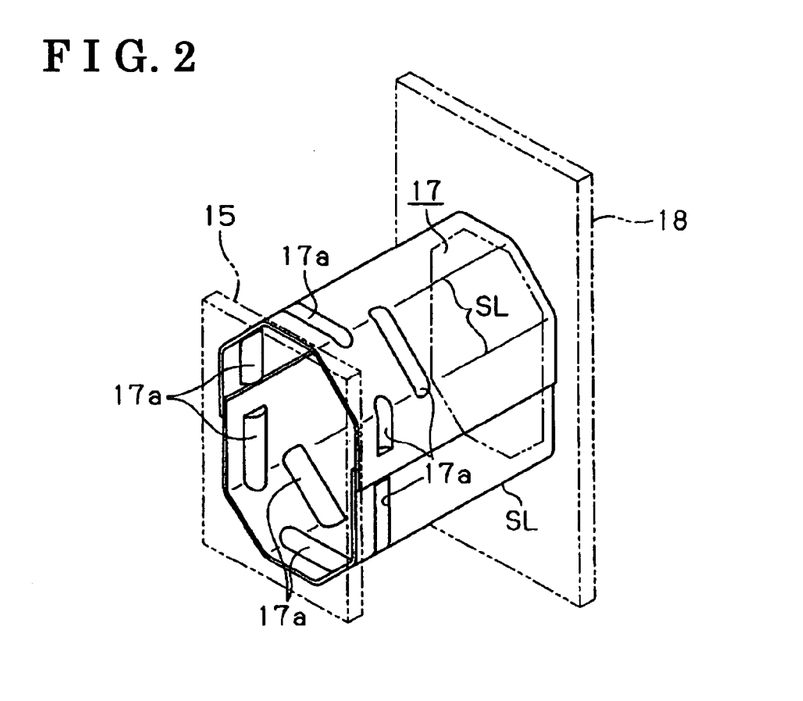
FIG. 2 illustrates an oblique perspective view indicating the first embodiment.

The structure of the crash absorbing box 17 will be explained with reference to FIG. 2. FIG. 2 illustrates an oblique perspective view indicating the crash absorbing box 17 according to the first embodiment. As shown in FIG. 2, the crash absorbing box 17 is formed so as to be hollowed and has an octagonal cross section. Further, plural bead-shaped stress concentrated portions 17a (in this embodiment, eight stress concentrated portions) are formed at a front end portion of the crash absorbing box 17. Specifically, the stress concentrated portions 17a are formed so as to be recessed at the front end portion of the crash absorbing box 17. More specifically, these stress concentrated portions 17a are formed by molding to be starting points of the plastic deformation caused by an axial compression load. These stress concentrated portions 17a are formed in order to reduce the level of the axial compression load by which the crash absorbing box 17 starts plastic deformation (initial buckling deformation).

Further, on the front end of the crash absorbing box 17, a bracket 15 to which a bolt is screwed is fixed by welding. Specifically, the crash absorbing box 17 is fixed to the bumper reinforcement 16 by means of bolts screwed into the bracket 15 or by welding the bracket 15.

The crash absorbing box 17 includes plural welding portions at which the bracket 15 is welded. Specifically, the welding portions are provided along at least four sides of the octagonal opening of the crash absorbing box 17, and thus the bracket 15 is fixed to the crash absorbing box 17 by welding at these welding portions.

The crash absorbing box 17 further includes plural welding portions at which the bracket 18 is welded. Specifically, the welding portions are provided along at least four sides of the octagonal opening of the crash absorbing box 17, and thus the bracket 18 is fixed to the crash absorbing box 17 by welding at these welding portions.

In this circumstance, strength of the crash absorbing box 17 against a lateral bending can be enhanced, in other words, it becomes difficult that the crash absorbing box 17 bends in a lateral direction.

Figure 1:
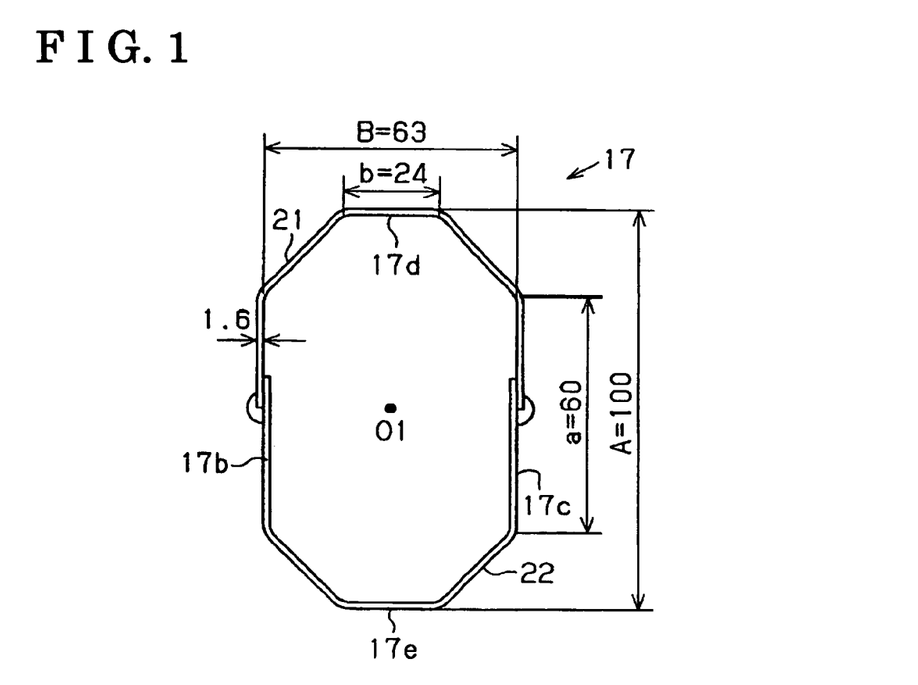
FIG. 1 illustrates a front view indicating a first embodiment of the present invention.

A structure of the crash absorbing box 17 and an energy absorbing manner of the crash absorbing box 17 upon an axial compression obtained on a basis of an experimental test will be explained. FIG. 1 illustrates a front view indicating the crash absorbing box 17. As shown in FIG. 1, the crash absorbing box 17 is made of SPH440 and formed in a manner where a pair of pressed iron materials 21 and 22 formed in the shape of one side of a square bracket with corners cut off are put together and welded so as to be in an octagon-shape in its cross section. A length of the crash absorbing box 17 (each of the pressed iron materials 21 and 22) in an axial direction (in a direction orthogonal to FIG. 1) is set to 91.5 mm, and a thickness of the crash absorbing box 17 (each of the pressed iron materials 21 and 22) is set to 1.6 mm. The crash absorbing box 17 is approximately symmetrical about a point O1 in a front view (cross section), excepting these thicknesses, and comprised of a left side 17b, a right side 17c, an upper side 17d and a lower side 17e. Specifically, the left side 17b and the right side 17c, serving as first sides which are provided to be paralleled to each other (extending in a vertical direction at the right and the left portions of the crash absorbing box 17 in FIG. 1), and the upper side 17d and the lower side 17e, serving as second sides which are provided to be parallel to each other (extending in a horizontal direction at the upper and the lower portions of the crash absorbing box 17 in FIG. 1), are positioned in a direction perpendicular to each other. Further, as shown in FIG. 1, oblique lines (connecting sides) are provided so as to connect each of adjacent sides 17b, 17c, 17f and 17e of the crash absorbing box 17.

In this circumstance, a length "a" of the left side 17b and the right side 17c is set at 60 mm. Further, assuming that each of the cut off corners of the pressed iron materials 21 and 22 are exist and the cross section is rectangular shape, a length "A" of a left side and a right side, in other words, a distance between the upper side 17d and the lower side 17e, is set at 100 mm.

On the other hand, a length "b" of the upper side 17d and the lower side 17e is set at 24 mm. Further, assuming that each of the cut off corners of the pressed iron materials 21 and 22 exist and the cross section is rectangular shape, a length "B" of a upper side and a lower side, in other words, a distance between the left side 17b and the right side 17c, is set at 63 mm.

Thus, in this embodiment, a ratio of the length a relative to the length "A" (a/A) is 60% (=60/100×100), and a ratio of the length b relative to the length "B" (b/B) is 38% (=24/63×100). In other words, each of ridge lines SL (shown in FIG. 2), which extends in an axial direction of the crash absorbing box 17, is positioned in a manner where a distance between the rigid lines, which are corresponding to the length "a" in a cross section of the crash absorbing box 17, is set to 60% of the length "A", and a distance between the rigid lines, which are corresponding to the length "b" in a cross section of the crash absorbing box 17, is set to 38% of the length "B".

A solid line in FIG. 6 indicates a relationship between a deformation characteristic (stroke) and an axial compression load on a basis of an experimental test in which a predetermined energy amount J is applied to the crash absorbing box 17 so as to be compressed in an axial direction. As shown in FIG. 6, the crash absorbing box 17 being hollowed and having a constant octagonal cross section performs small wavelength and small amplitude of the load (axial compression load) required for deforming the crash absorbing box when the crash absorbing box has consecutively repeated plastic deformation (a buckling deformation) so as to be in a concertina shape in order to absorb the impact energy.

Further, it is experimentally confirmed that the energy absorbing effect, which is obtained until the stroke reaches the maximum stroke, is high such as 90%.

The first embodiment has following effects.

(1) In the first embodiment, because a crash absorbing box is hollowed and has an octagonal cross section, the number of the ridge lines extending in an axial direction becomes large. In other words, according to the present invention, the number of peak points of the crash absorbing box in its cross section becomes large. Thus, a level of a load (axial compression load) required for deforming the crash absorbing box can be enhanced, as a result, the thickness of the crash absorbing box can be reduced. In other words, even when the thickness of the crash absorbing box is reduced, a level of the load (axial compression load) required for deforming the crash absorbing box can be enhanced, as a result, the crash absorbing box can be reduced in size and weight.

Further, because a length of each side of the crash absorbing box having an octagonal cross section is short, the crash absorbing box is deformed little by little in a manner where a wavelength (period) of the load (axial compression load) required for deforming the crash absorbing box becomes small when the crash absorbing box has consecutively repeated plastic deformation (a buckling deformation) so as to be in a concertina shape in order to absorb the impact energy. Thus, amplitude of the load (axial compression load) required for deforming the crash absorbing box becomes small, as a result, the energy absorbing effect can be improved.

Figure 4:
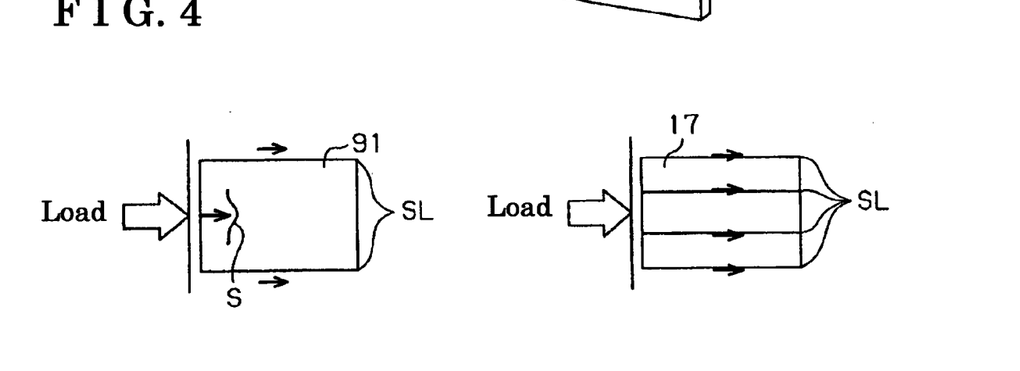
FIG. 4 illustrates a pattern diagram indicating a crash absorbing box having a rectangular cross section.

(2) In this embodiment, because a length of each side of the crash absorbing box 17 in its cross section becomes short, a load can be evenly transmitted to the entire crash absorbing box 17 (ridge line SL). Thus, as shown in FIG. 4 schematically indicating the crash absorbing box 91 having a rectangular cross section and schematically indicating the crash absorbing box 17 having an octagonal cross section, the load can be effectively transmitted to each of the ridge lines SL of the crash absorbing box 17, and thus preferable transmission efficiency of the load can be obtained.

Further, because the length of each side of the crash absorbing box 17 in cross section is short, buckling on surface S can be reduced, as a result, it becomes difficult that the crash absorbing box 17 bends in a lateral direction.

(Second Embodiment)

A second embodiment according to the present invention will be explained with reference to attached drawing figures. The second embodiment basically has a similar structure, and the emphasis will be placed on an explanation of differences from the first embodiment, such as the ratio of the length "a" relative to the length A and the ratio of the length "b" relative to the length B.

Figure 5:
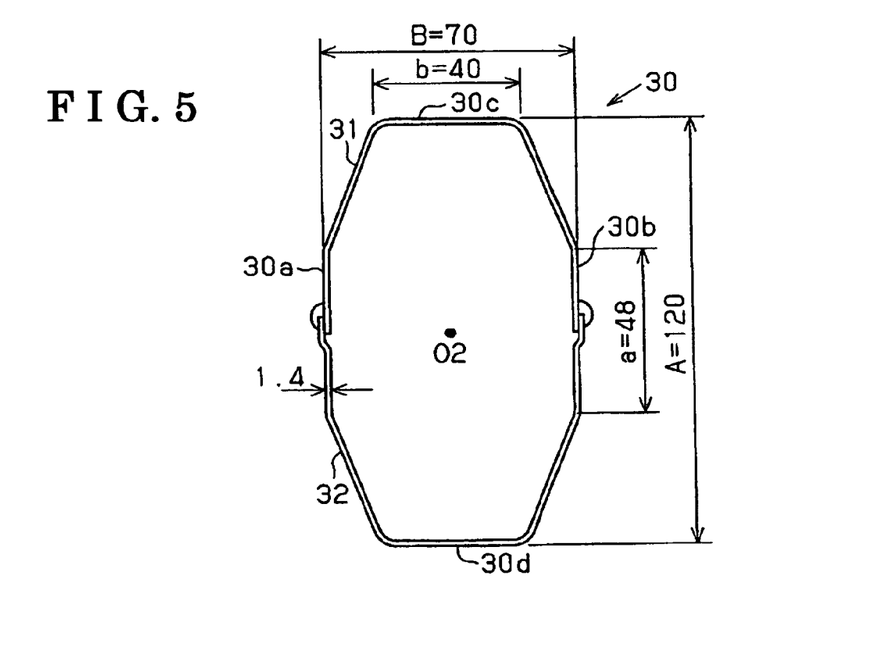
FIG. 5 illustrates a front view indicating a second embodiment of the present invention.

FIG. 5 illustrates a front view indicating the crash absorbing box 30. As shown in FIG. 5, the crash absorbing box 30 is formed in a manner where a pair of pressed iron materials 31 and 32, formed in the shape of one side of a square bracket with corners cut off, are put together and welded so as to be in an octagon shape in its cross section. A thickness of the crash absorbing box 30 (each of the pressed iron materials 31 and 32) is set to 1.4 mm. The crash absorbing box 30 is approximately symmetrical about a point O2 in a front view (cross section), excepting these thicknesses, and comprised of a left side 30a, a right side 30b, an upper side 30c and a lower side 30d. Specifically, the left side 30a and the right side 30b serving as the first sides which are provided to be parallelized together (extending in a vertical direction at the right and the left portions of the crash absorbing box 30 in FIG. 5) and the upper side 30c and the lower side 30d serving as the second sides which are provided to be parallelized together (extending in a horizontal direction at the upper and the lower portions of the crash absorbing box 30 in FIG. 5) are positioned in a direction perpendicular to each other. Further, as shown in FIG. 5, oblique lines (connecting sides) are provided so as to connect each of adjacent sides 30a, 30b, 30c and 30d of the crash absorbing box 30.

In this circumstance, a length "a" of the left side 30a and the right side 30b is set at 48 mm. Further, assuming that each of the cut off corners of the pressed iron materials 31 and 32 exist and the cross section is rectangular shape, a length "A" of a left side and a right side, in other words, a distance between the upper side 30c and the lower side 30d, is set at 120 mm.

On the other hand, a length "b" of the upper side 30c and the lower side 30d is set at 40 mm. Further, assuming that each of the cut off corners of the pressed iron materials 31 and 32 exist and the cross section is rectangular shape, a length "B" of a upper side and a lower side, in other words, a distance between the left side 30a and the right side 30b, is set at 70 mm.

Thus, in this embodiment, a ratio of the length a relative to the length "A" (a/A) is 40% (=48/120×100), and a ratio of the length b relative to the length "B" (b/B) is 57% (=40/70×100). In other words, each of ridge lines SL (shown in FIG. 2), which extends in an axial direction of the crash absorbing box 30, is positioned in a manner where a distance between the rigid lines, which are corresponding to the length "a" in a cross section of the crash absorbing box 30, is set to 40% of the length "A", and a distance between the rigid lines, which are corresponding to the length "b" in a cross section of the crash absorbing box 30, is set to 57% of the length "B". Thus, the same effects as the first embodiment can be obtained in the second embodiment.

(Third Embodiment)

A third embodiment according to the present invention will be explained with reference to attached drawing figures. In this third embodiment, an analytical model in accordance with the first embodiment is prepared, and on the basis of relationships between the experimental results, which are explained in the first and the second embodiment and shown in FIG. 6, and analytic results of the analytical model, shapes of the crash absorbing boxes by which a preferable energy absorbing effect (85% or more) can be achieved will be explained.

In the analytical model, the crash absorbing boxes are made of SPH 440 and includes an octagonal cross section, and a length of each crash absorbing box is set to 100 mm, and a thickness of each crash absorbing box is set to 1.6 mm. One opening portion of the crush box (opening to which a load is applied) is covered by use of a plate material, which is made of SPH 440 so as to be in 2.0 mm in thickness, and the other opening portion of the crush box (opening at which the crush box is fixed to the body) is covered by use of a plate material, which is made of SPH 440 so as to be in 3.0 mm in thickness. A common software is used for a temporal transition of the compulsory deformation of the rigid body and an analysis, and a finite element method is used in the analysis.

Figure 7A:
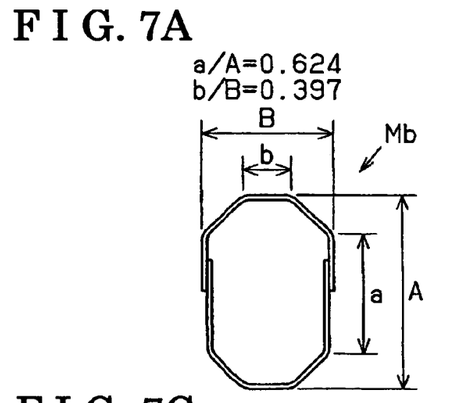
FIG. 7A illustrates a front view indicating a third embodiment according to the present invention.
Figure 8:
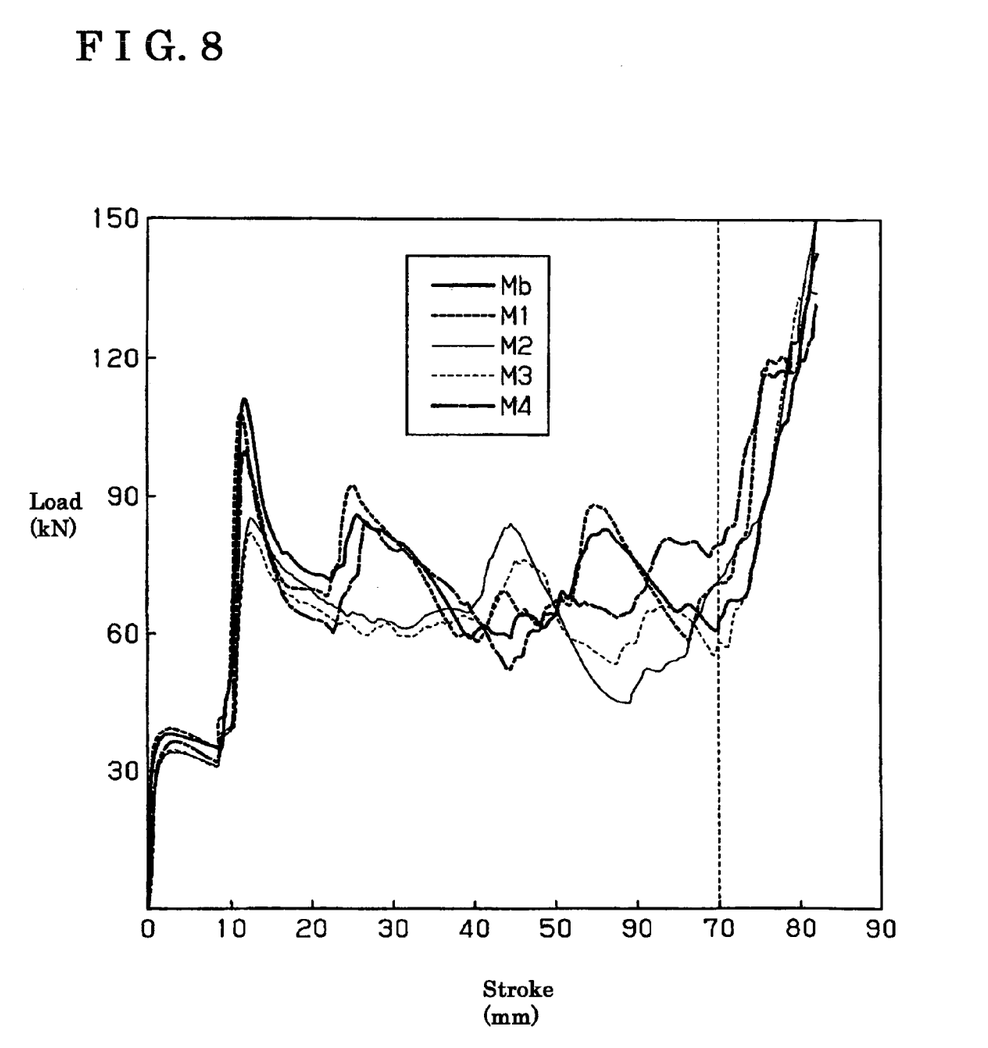
FIG. 8 illustrates a graph showing a relationship between a deformation characteristic (stroke) of a crash absorbing box and an axial compression load.

FIG. 7A illustrates a cross section of a crush box of a basic model Mb (an analytical model). In this crash box, a ratio of a length "a" relative to a length A (a/A) is set to 62.4%, a ratio of a length "b" relative to a length B (b/B) is set to 39.7%, a peripheral length in its cross section is set to 279.15 mm, and weight is set to 0.3869 kg. A relationship between a deformation characteristic (stroke) and an axial compression load of the model Mb, which are analyzed in the same manner as in the first and the second embodiments, is shown in a solid heavy line is shown in FIG. 8. It is confirmed from the analytical result of this model that an energy absorbing effect is 90%, which is the same as the experimental result in the first embodiment. Thus, it can be assumed that a preferable energy absorbing effect can also be obtained in the experimental result, if a preferable energy absorbing effect (e.g. 85% or more) can be obtained in the analytical result of the analytical model.

On the basis of the relationship between the analytical results and the experimental results, analytical result using each of models M1, M2, M3 and M4 illustrated in FIG. 7B, FIG. 7C, FIG. 7D and FIG. 7E will be explained.

Figure 7B:
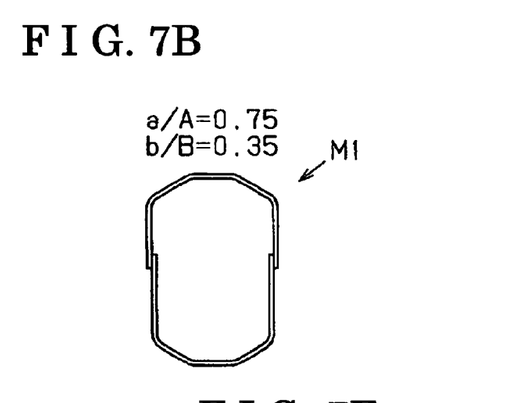
FIG. 7B illustrates a front view indicating the third embodiment according to the present invention.

FIG. 7B illustrates a cross section of a crush box of a model M1. In this crash box, a ratio of a length "a" relative to a length A (a/A) is set to 75%, a ratio of a length "b" relative to a length B (b/B) is set to 35%, a peripheral length in its cross section is set to 287.716 mm, and weight is set to 0.3980 kg. A relationship between a deformation characteristic (stroke) and an axial compression load of the model M1 is shown in a dotted thick line is shown in FIG. 8. It is confirmed from the analytical result of this model that an energy absorbing effect is 88%, which is relatively high. Thus, it can be assumed that a preferable energy absorbing effect can also be obtained in the experimental result of the model M1.

Figure 7C:
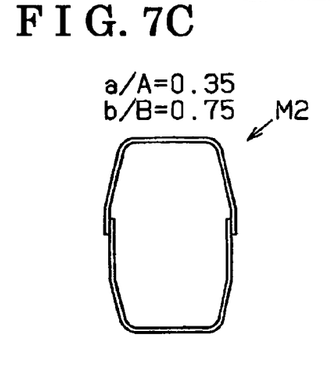
FIG. 7C illustrates a front view indicating the third embodiment according to the present invention.

FIG. 7C illustrates a cross section of a crush box of a model M2. In this crash box, a ratio of a length "a" relative to a length A (a/A) is set to 35%, a ratio of a length "b" relative to a length B (b/B) is set to 75%, a peripheral length in its cross section is set to 297.902 mm, and weight is set to 0.4114 kg. A relationship between a deformation characteristic (stroke) and an axial compression load of the model M2 is shown in a solid thin line is shown in FIG. 8. It is confirmed from the analytical result of this model that an energy absorbing effect is 78%, which is relatively low.

Figure 7D:
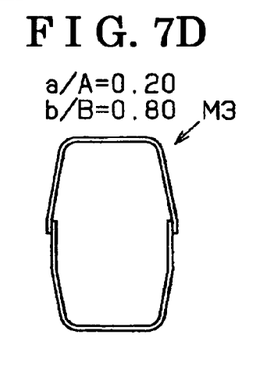
FIG. 7D illustrates a front view indicating the third embodiment according to the present invention.

FIG. 7D illustrates a cross section of a crush box of a model M3. In this crash box, a ratio of a length "a" relative to a length A (a/A) is set to 20%, a ratio of a length "b" relative to a length B (b/B) is set to 80%, a peripheral length in its cross section is set to 302.668 mm, and weight is set to 0.4176 kg. A relationship between a deformation characteristic (stroke) and an axial compression load of the model M3 is shown in a dotted thin line is shown in FIG. 8. It is confirmed from the analytical result of this model that an energy absorbing effect is 77%, which is relatively low.

Figure 7E:
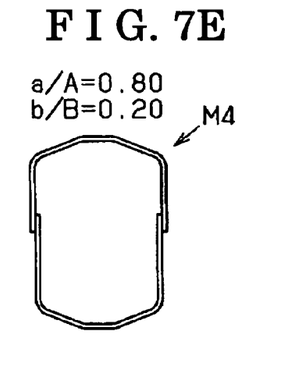
FIG. 7E illustrates a front view indicating the third embodiment according to the present invention.

FIG. 7E illustrates a cross section of a crush box of a model M4. In this crash box, a ratio of a length "a" relative to a length A (a/A) is set to 80%, a ratio of a length "b" relative to a length B (b/B) is set to 20%, a peripheral length in its cross section is set to 291.062 mm, and weight is set to 0.4026 kg. A relationship between a deformation characteristic (stroke) and an axial compression load of the model M4 is shown in a dotted thick line is shown in FIG. 8. It is confirmed from the analytical result of this model that an energy absorbing effect is 85%, which is relatively high. Thus, it can be assumed that a preferable energy absorbing effect can also be obtained in the experimental result of the model M4.

On the basis of the experimental results according to the first and the second embodiments, the above analytical results are summarized as follows. A preferable energy absorbing effect, which is 85% or more, in an experimental result can be obtained when a ratio of a length "a" relative to a length A (a/A) is set within $0.4 \leq a/A \leq 0.8$ and a ratio of a length "b" relative to a length B (b/B) is set within $0.2 \leq b/B \leq 0.7$.

The third embodiment has following effect in addition to the effect described in the first embodiment.

(1) In a ferrous metal material (SPH440), a length of A is set to a value that is larger than that of B, and a length "a" relative to a length A (a/A) is set within $0.4 \leq a/A \leq 0.8$ and a ratio of a length "b" relative to a length B (b/B) is set within $0.2 \leq b/B \leq 0.7$. Thus, a preferable energy absorbing effect, which is 85% or more, can be obtained.

The above embodiments can be modified as follows. Instead of the abovementioned crash absorbing boxes, a crash absorbing box 40 can be used alternatively. Specifically, the crash absorbing box 40 is comprised of iron press materials 41 and 42, which are pressed so as to be in a square bracket with corners cut off in cross section, and these materials are put together and welded by spot welding at spot welding portions (shown by "+" in FIG. 9), which are provided at a side portion of an opening of each of the materials and spaced in an axial direction. More specifically, the side portion of the opening is formed so as to protrude in a wave shape. Thus, these iron press materials 41 and 42 are welded so as to have an octagonal cross section.

Figure 9:
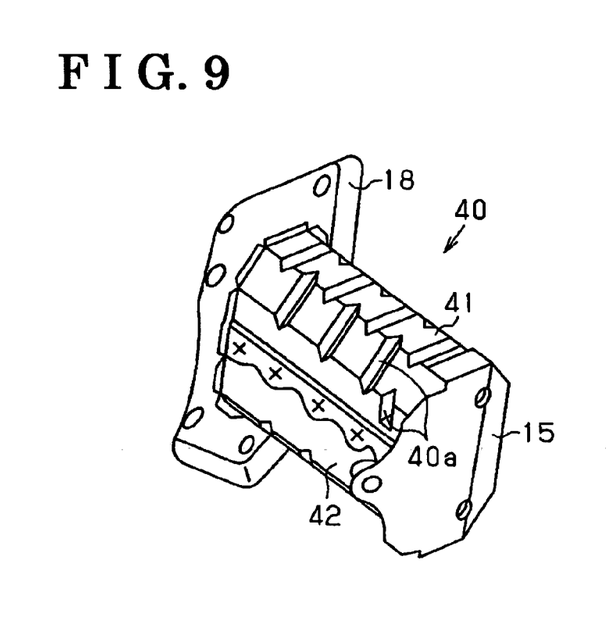
FIG. 9 illustrates an oblique perspective view indicating an alternative way according to the present invention.

The crash absorbing box 40 includes plural stress concentrated portions 40a which are formed in a bead-shape so as to be recessed inward and spaced in an axial direction. These stress concentrated portions 40a are formed by molding, and the plastic deformation starts from these stress concentrated portions 40a. These stress concentrated portions 40a are formed in order to reduce a level of the axial compression load when the crash absorbing box 40 starts plastic deformation. The stress concentrated portions 40a are positioned at different levels in an axial direction from the spot welding portions. The crash absorbing box 40 formed in this structure has the same effect as the first embodiment.

Further, as shown in FIG. 9, the plastic deformation of the crash absorbing box 40 caused by the axial compression load can start from not only the stress concentrated portions 40a but also the spot welding portions. In other words, the crash absorbing box 40 is plastic deformed in a manner where it is folded at the spot welding portions so as to be in a concertina shape.

Further, because the spot welding portions and the stress concentrated portions 40a are positioned so as to alternate each other in an axial direction of the crash absorbing box 40, the crash absorbing box 40 can be more continuously and stably in its plastic deformation, comparing to a case where a crash absorbing box 40 is formed by arc welding within entire length of the iron press materials 41 and 42, as a result, the energy absorbing effect can be improved.

In the third embodiment, the crash absorbing box 40 may be made of a plate of a ferrous metal such as SPH 270 or SPH 590, and thickness of the plate may be set to 1.4 mm.

In each of the embodiments, the structure of the connection between the crash absorbing boxes 17 and 30 and the bumper reinforcement 16 and the side member 12 are examples and can be modified. Further, in each of the embodiments, the present invention is applied to the bumper (the bumper frame 11) provided at the front portion of the vehicle however, the present invention can be applied to the rear bumper.

In this embodiment, the ferrous metal includes an iron, a steel and a ferrous alloy.

The present invention has following effects.

According to the present invention, because a shock absorbing device is hollowed and has an octagonal cross section, the number of the ridge line extending in an axial direction becomes large. In other words, according to the present invention, the number of peak points of the shock absorbing device in its cross section becomes large. Thus, a level of a load (axial compression load) required for deforming the shock absorbing device can be increased, as a result, the thickness of the shock absorbing device can be reduced. In other words, even when the thickness of the shock absorbing device is reduced, a level of the load (axial compression load) required for deforming the shock absorbing device can be increased, as a result, the shock absorbing device can be reduced in size and weight.

Further, because a length of each side of the shock absorbing device in its cross section becomes short, the shock absorbing device can perform small wavelength (short period) of the load (axial compression load) required for deforming the shock absorbing device when the shock absorbing device has consecutively repeated plastic deformation (a buckling deformation) little by little so as to be in a concertina shape in order to absorb the impact energy, and then amplitude of the load (axial compression load) required for deforming the shock absorbing device can be small, as a result, the energy absorbing effect can be improved.

According to the present invention, assuming that a length of each of the first sides, which are made of a ferrous metal, is set to "a", a distance between the pair of second sides is set to A, a length of each of the second sides, which are made of a ferrous metal, is set to "b", and a distance between the pair of first sides is set to B, the distance A is set to be greater than the distance B, and a ratio of the length "a" relative to the distance A (a/A), and a ratio of the length "b" relative to the distance B (b/B), are set to the following ranges; $0.4 \leq a/A \leq 0.8$ and $0.2 \leq b/B \leq 0.7$.

In this configuration, it is confirmed that the energy absorbing effect can be improved. Thus, amplitude of the load (axial compression load) required for deforming the shock absorbing device can be reduced, as a result, the energy absorbing effect, which is obtained until the stroke reaches the maximum stroke, can be improved.

According to the present invention, the shock absorbing device includes a spot welding portion to which spot welding is applied, and a stress of the axial compression load is concentrated to the spot welding portion. Then, the plastic deformation caused by the axial compression load can start from the spot welding portion. Thus, the shock absorbing device can be plastic deformed in a manner where it is folded at the spot welding portion so as to be in a concertina shape.

According to the present invention, the shock absorbing device for a vehicle further includes a bead-shaped stress concentrated portion from which the plastic deformation starts, and the stress concentrated portion and the spot welding portion are positioned so as to be at different levels to each other in an axial direction. Thus, the consecutive plastic deformation so as to be in a concertina shape can be stable, as a result, the energy absorbing effect can be improved.

According to the present invention, because a crash absorbing box is hollowed and has an octagonal cross section, the number of the ridge line extending in an axial direction becomes large. In other words, according to the present invention, the number of peak points of the crash absorbing box in its cross section becomes large. Thus, a level of a load (axial compression load) required for deforming the crash absorbing box can be enhanced, as a result, the thickness of the crash absorbing box can be reduced. In other words, even when the thickness of the crash absorbing box is reduced, a level of the load (axial compression load) required for deforming the crash absorbing box can be enhanced, as a result, the crash absorbing box can be reduced in size and weight.

Further, because a length of each side of the crash absorbing box having an octagonal cross section is short, the crash absorbing box is crushed little by little in a manner where wavelength (period) of the load (axial compression load) required for deforming the crash absorbing box becomes small when the crash absorbing box has consecutively repeated plastic deformation (a buckling deformation) so as to be in a concertina shape in order to absorb the impact energy. Thus, amplitude of the load (axial compression load) required for deforming the crash absorbing box can be small, as a result, the energy absorbing effect can be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A shock absorbing device for a vehicle, the shock absorbing device absorbing an axial compression load by means of plastic deformation in order to absorb an impact energy, wherein the shock absorbing device for a vehicle is hollowed and has an octagonal cross section, and wherein the shock absorbing device is made of a ferrous metal and, in cross section, includes:

a pair of first sides extending so as to be parallel to each other;

a pair of second sides extending so as to be parallel to each other in a direction perpendicular to the first sides;

four connecting sides provided so as to connect each of adjacent first sides and the second sides; and assuming that a length of each of the first sides is set to "a", a distance between the pair of second sides is set to A, a length of each of the second sides is set to "b", and a distance between the pair of first sides is set to B, the distance A is set to be greater than the distance B, and a ratio of the length "a" relative to the distance A (a/A), and a ratio of the length "b" relative to the distance B (b/B), are set to the following ranges;

$0.4 \leq a/A \leq 0.8$ $0.2 \leq b/B \leq 0.7$.

2. The shock absorbing device for a vehicle according to claim 1, wherein the shock absorbing device further includes a stress concentrated portion that serves as a starting point for the plastic deformation caused by the axial compression load starts.

3. The shock absorbing device for a vehicle according to claim 1, wherein a pair of board materials are connected together by spot welding at a spot welding portion so as to have an octagonal cross section.

4. The shock absorbing device for a vehicle according to claim 1, wherein the shock absorbing device for a vehicle further includes a bead-shaped stress concentrated portion, and the stress concentrated portion and the spot welding portion are positioned so as to be at different levels to each other in an axial direction.

* * * * *